(12) United States Patent
Kakishima et al.

(10) Patent No.: US 7,664,835 B2
(45) Date of Patent: Feb. 16, 2010

(54) COMMUNICATION CONTROL UNIT AND COMMUNICATION CONTROL METHOD

(75) Inventors: Jun Kakishima, Yokohama (JP); Hiroshi Kawakami, Yokosuka (JP); Wataru Takita, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 458 days.

(21) Appl. No.: 11/511,332

(22) Filed: Aug. 29, 2006

(65) Prior Publication Data

US 2007/0067491 A1 Mar. 22, 2007

(30) Foreign Application Priority Data

Aug. 30, 2005 (JP) ............... P2005-249895

(51) Int. Cl.
*G06F 15/16* (2006.01)

(52) U.S. Cl. ............ 709/220; 709/219

(58) Field of Classification Search ........ 709/220–222, 709/203; 717/174
See application file for complete search history.

(56) References Cited

U.S. PATENT DOCUMENTS

| | | | | |
|---|---|---|---|---|
| 5,943,478 | A * | 8/1999 | Aggarwal et al. | 726/3 |
| 7,159,018 | B2 * | 1/2007 | Amro et al. | 709/221 |
| 7,188,251 | B1 * | 3/2007 | Slaughter et al. | 713/182 |
| 7,328,434 | B2 * | 2/2008 | Swanson et al. | 717/168 |
| 7,454,505 | B2 * | 11/2008 | Kallner et al. | 709/227 |
| 2001/0002914 | A1 * | 6/2001 | Aramoto | 370/535 |
| 2005/0144220 | A1 * | 6/2005 | Maekawa et al. | 709/203 |

FOREIGN PATENT DOCUMENTS

JP 2004-147128 5/2004

OTHER PUBLICATIONS

Mick O'Doherty, "Sip Servlet Delivery", Internet Engineering Task Force, Internet Draft, XP-015033351, Jul. 2000, 16 Pages.
Henning Schulzrinne et al., "Internet Telephony:Architecture and Protocols-an IETF Perspective", Computer Networks and ISDN Systems, XP-000700321, vol. 31, No. 3, Feb. 11, 1999, pp. 237-255.

* cited by examiner

*Primary Examiner*—Joseph E Avellino
*Assistant Examiner*—Catherine Thiaw
(74) *Attorney, Agent, or Firm*—Oblon, Spivak, McClelland, Maier & Neustadt, L.L.P.

(57) ABSTRACT

A communication control unit receives destination terminal identification information and communication software from a source communication terminal. The communication control unit installs software. Address information of another communication control unit is acquired from an externally located apparatus. The another communication control unit can be connected to a destination communication terminal corresponding to the destination terminal identification information. The destination terminal identification information and software identification information uniquely identifying the installed software is transmitted to an address of the another communication control unit included in the address information. Software identification data is transmitted to the another communication control unit. Software corresponding to the software identification data is received and installed to control a network connection of the another communication control unit.

6 Claims, 7 Drawing Sheets

Fig.3

| ALLOCATED LINES | TERMINAL IDENTIFICATION INFORMATION |
|---|---|
| 001 | Bob@aaa.co.jp |
| ⋮ | ⋮ |

*Fig.5*

| TERMINAL IDENTIFICATION INFORMATION | COMMUNICATION CONTROL UNIT ADDRESSES | COMMUNICATION CONTROL UNIT ID |
|---|---|---|
| Bob@aaa.co.jp | 180.XXX.XXX.XXX | A0001 |
| Alice@bbb.com | 170.XXX.XXX.XXX | B0051 |
| ⋮ | ⋮ | ⋮ |

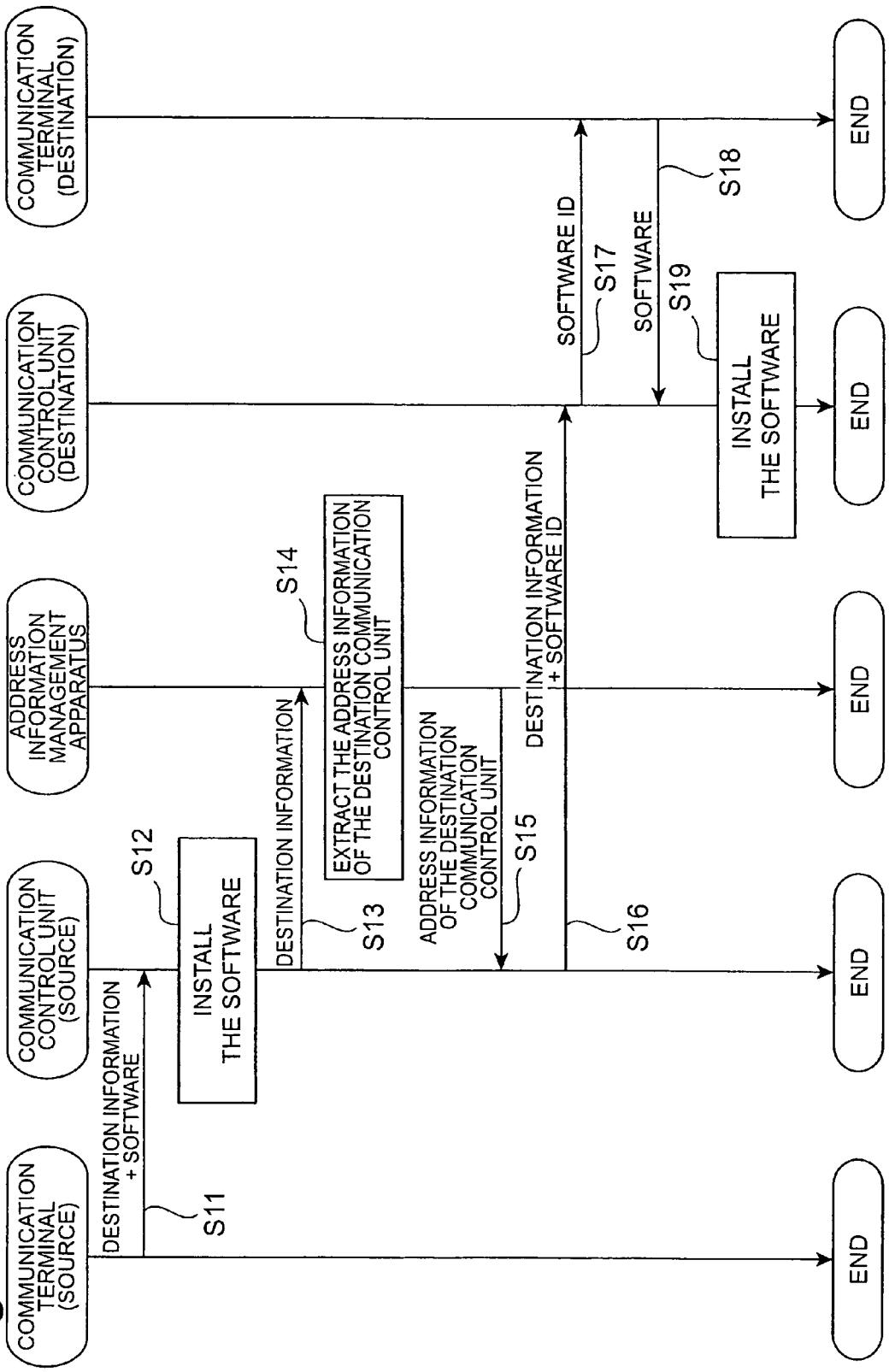

COMMUNICATION CONTROL UNIT AND COMMUNICATION CONTROL METHOD

BACKGROUND

1. Technical Field

The present invention relates to a communication control unit and a communication control method.

2. Description of the Related Art

Conventionally, when a communication terminal newly is to participate in a network, it is inevitably necessary to register the communication terminal in a domain, so as to acquire an IP address. For Example, in Japanese Patent Application Laid-open No. 2004-147128, there is disclosed a technique of mutually communicating between each communication terminal (image communication unit) which has been registered in a domain and an IP address is assigned to. According to the above technique, a session between each communication terminal is controlled by the use of a SIP (Session Initiation Protocol) proxy server.

Now, in general, the SIP specification is different depending on the vendors. Therefore, in order to communicate between communication terminals of different vendors using the above-mentioned prior art, it is necessary to provide, for each SIP specification applied to each communication terminal, an SIP proxy server appropriate to the applied specification. In this case, by attaching an identical domain name to each SIP proxy server, a different global IP address is assigned thereto, which requires complicated processing.

In order to improve the above, it is an object of the present invention to provide a communication control unit and a communication control method enabling a variety of communication terminals having not been registered in a domain to participate in a network without the need of complicated processing.

SUMMARY OF THE INVENTION

A communication control unit of an embodiment in accordance with the present invention includes a receiving means for receiving destination terminal identification information for uniquely identifying a destination communication terminal, to which a message is destined, and software for communication control from a source communication terminal, from which the message is sent; an installation execution means for installing the software received by the receiving means; an address information acquisition means for transmitting the destination terminal identification information received by the receiving means to an externally located address information management apparatus, and for acquiring from the address information management apparatus address information of another communication control unit connectable to the destination communication terminal corresponding to the transmitted destination terminal identification information; and a transmitting means for transmitting the destination terminal identification information received by the receiving means and software identification information for uniquely identifying the software received by the receiving means, to an address included in the address information acquired by the address information acquisition means.

Further, a communication control method of an embodiment in accordance with the present invention includes a receiving step for receiving destination terminal identification information for uniquely identifying a destination communication terminal to which a message is destined, and software for communication control from a source communication terminal from which the message is sent; an installation execution step for installing the software received in the receiving step; an address information acquisition step for transmitting the destination terminal identification information received in the receiving step to an externally located address information management apparatus, and for acquiring from the address information management apparatus address information of another communication control unit connectable to the destination communication terminal corresponding to the transmitted destination terminal identification information; and a transmitting step for transmitting the destination terminal identification information received in the receiving step and software identification information for uniquely identifying the software received in the receiving step, to an address included in the address information acquired in the address information acquisition step.

According to the embodiment of the present invention, since the communication control software received from the communication terminal of the message source can be installed, the network connection of the source communication terminal can be controlled using communication control software appropriate for the specification of the source communication terminal. Also, it is possible to acquire from an address information management apparatus address information of another communication control unit connectable to the destination communication terminal corresponding to the destination terminal identification information received from the communication terminal of the message source. Further, it is possible to transmit the destination terminal identification information and software identification information to the address included in the above address information. With this, it is possible to install the communication control software corresponding to the software identification information into another communication control unit connectable to the destination communication terminal. As such, according to the invention disclosed in the present application, common communication control software can be installed into both one communication control unit connectable to the source communication terminal and another communication control unit connectable to the destination communication terminal. Accordingly, the communication terminals can communicate with each other by the intermediary of the communication control unit capable of controlling network connection of each communication terminal. Therefore, it becomes possible for a variety of communication terminals not registered in the domain to participate in the network without the need of complicated processing.

Preferably, the communication control unit in accordance with the present invention includes an address information transmitting means for transmitting both terminal identification information for uniquely identifying a communication terminal connectable to the self-communication control unit and the address information of the self-communication control unit to the address information management apparatus.

In such a way, the terminal identification information of the communication terminal connectable to the self-communication control unit and the address information of the self-communication control unit can be transmitted to the address information management apparatus. With this, it becomes possible for the address information management apparatus to manage the terminal identification information of the communication terminal connectable to the self-communication control unit, in correspondence with the address information of the self-communication control unit.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3 is a diagram exemplarily illustrating a data structure of an allocated line information database shown in FIG. 2.

FIG. 5 is a diagram exemplarily illustrating a data structure of the address information database shown in FIG. 4.

FIG. 7 is a sequence chart exemplarily illustrating a process flow when a source communication terminal from which a message is sent starts communication with a destination communication terminal to which the message is destined.

DESCRIPTION OF THE EMBODIMENTS

Figure 1:
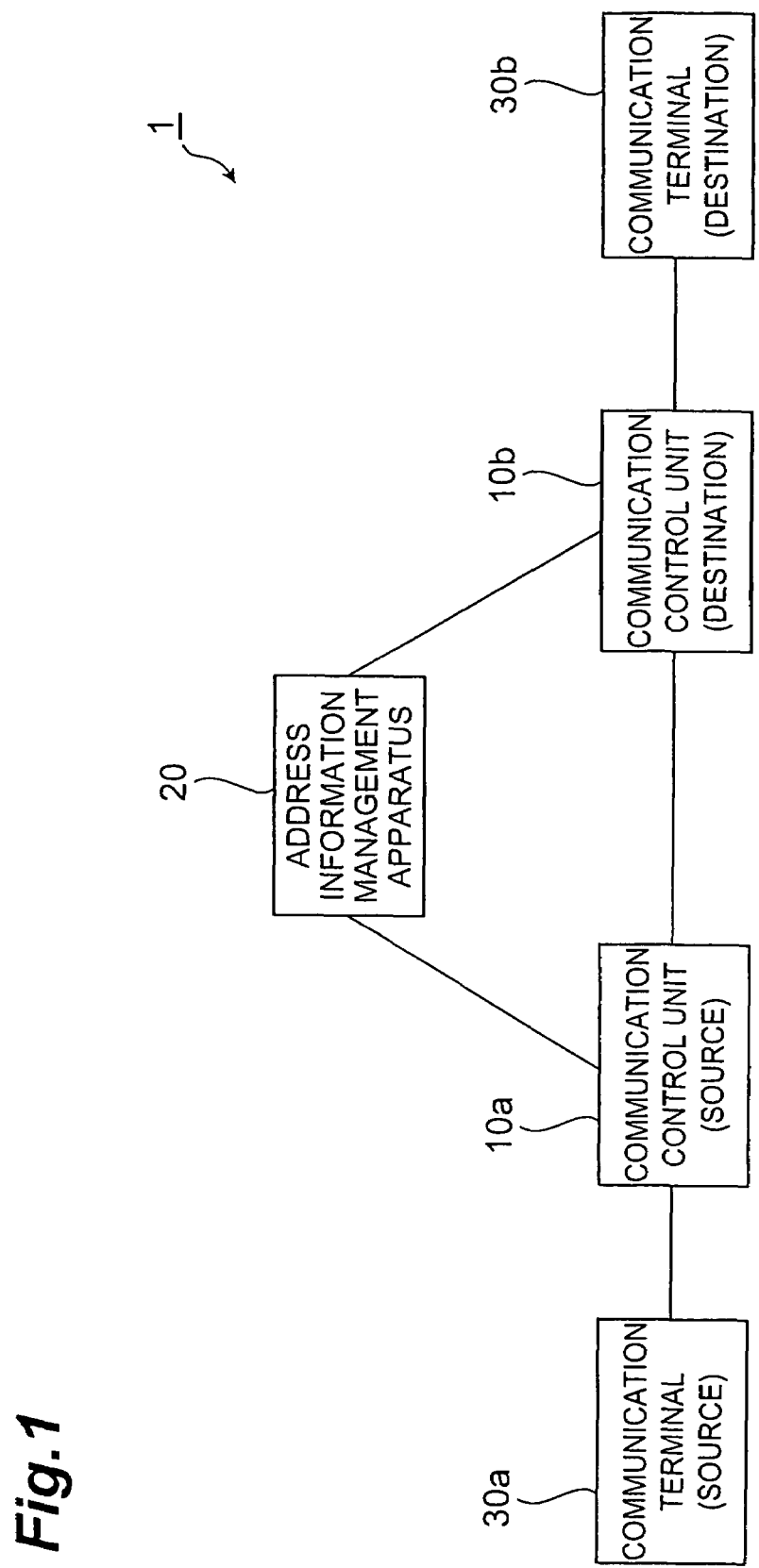
FIG. 1 is a diagram exemplarily illustrating a system configuration of a communication system according to an embodiment.

Hereinafter, the embodiments of the communication control unit and the communication control method will be described referring to the drawings. Incidentally, in the drawings, like elements are referred to by like reference symbols, and the duplicated description will be omitted.

FIG. 1 is a diagram exemplarily illustrating a system configuration of a communication system 1 according to the embodiment. As shown in FIG. 1, the communication system 1 includes a communication control unit 10, an address information management apparatus 20, and a communication terminal 30. A plurality of communication control units 10 and a plurality of communication terminals 30 exist. In the communication system 1 shown in FIG. 1, a communication control unit 10a on the source side, to which a communication terminal 30a of a transmission source is connected, and a communication control unit 10b on the destination side, to which a communication terminal 30b of a transmission destination is connected, are exemplarily shown.

The communication control unit 10 can exhibit functions as a so-called proxy server for managing the connection between the communication terminal 30 and a network such as the Internet by means of the software for communication control which is uploaded from the communication terminal 30 and installed therein.

The address information management apparatus 20 manages the address information of the communication control unit 10 to which the communication terminal 30 is connected.

The communication terminal 30 communicates with another communication terminal 30 by the intermediary of the communication control unit 10. The communication terminal 30 transmits a variety of messages according to operation instructions from users, and receives a variety of messages transmitted from other terminals and units. As a communication terminal 30, for example, a mobile communication terminal such as a portable telephone, a personal handy communication terminal (PHS), and a personal digital assistant (PDA) having a communication function, and a fixed communication terminal such as a personal computer, including a computer usable medium including computer-executable instructions, are applied. Additionally, the communication terminal 30 needs not to be constantly connected to the communication control unit 10, but may be connected depending on the necessity, for example, at the time of software upload, message transmission and reception, etc., as will be described later.

Figure 2:
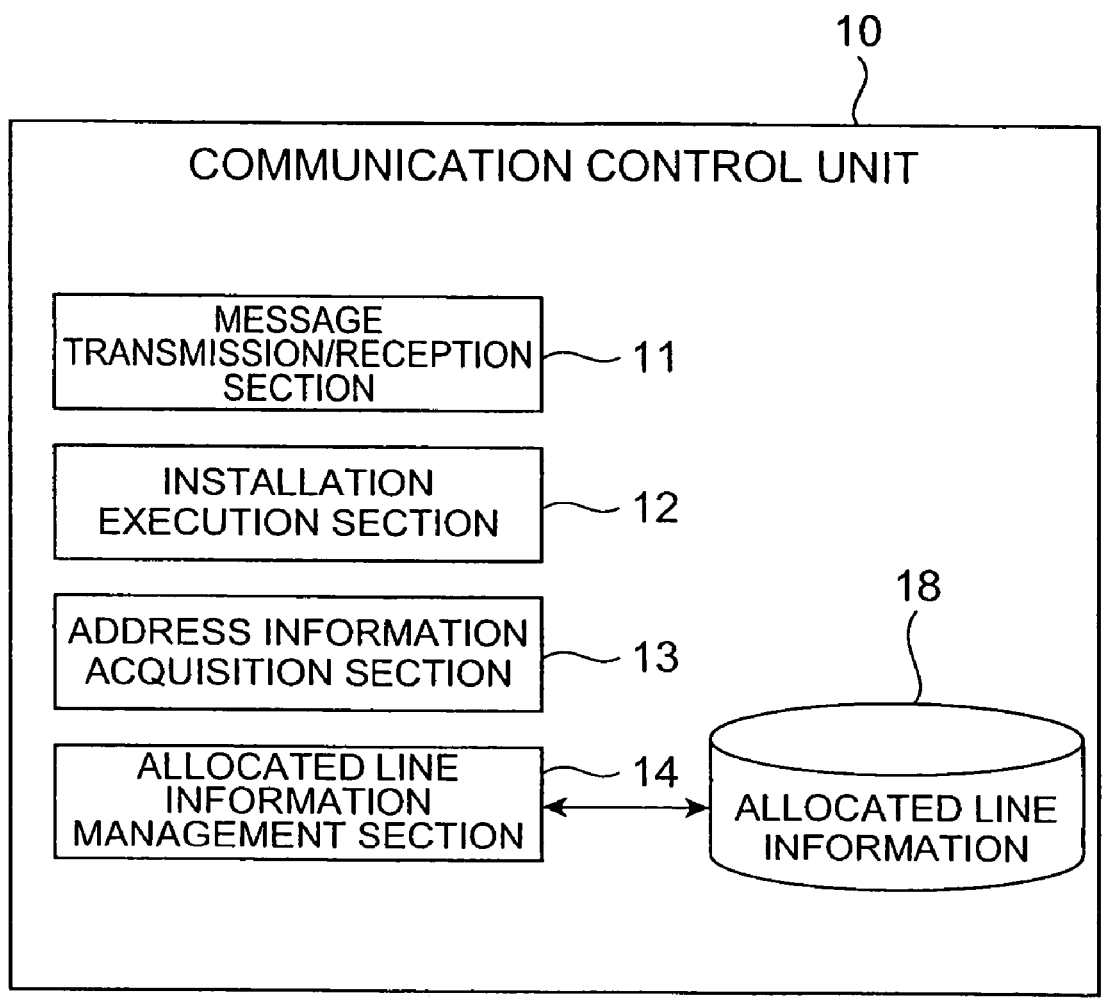
FIG. 2 is a diagram exemplarily illustrating a functional structure of the communication control unit shown in FIG. 1.

Next, referring to FIG. 2, the functional structure of the communication control unit 10 according to the present embodiment will be described. As shown in FIG. 2, the communication control unit 10 includes a message transmission/reception section 11 (receiving means, transmitting means and address information transmitting means), an installation execution section 12 (installation execution means), address information acquisition section 13 (address information acquisition means), and an allocated line information management section 14.

The message transmission/reception section 11 receives and transmits a variety of messages exchanged with another communication control unit 10, the address information management apparatus 20 and the communication terminal 30. The message contents to be transmitted and received include, for example, an address information registration request message, destination information, communication control software, and a software ID for identifying the communication control software. The address information registration request message is a message for requesting the address information management apparatus 20 to register therein the address information of the communication control unit 10 to which the communication terminal 30 is connected. The above address information registration request message includes terminal identification information for uniquely identifying the communication terminal, address information of the communication control unit and the like. The destination information is information related to the communication terminal 30b to which the message is to be sent. The above destination information includes terminal identification information for uniquely identifying the communication terminal. To the terminal identification information, for example, telephone number, terminal name, mail address, IP address and SIP address are applied. To the communication control software, software capable of controlling sessions between terminals like, for example, SIP is applied.

The installation execution section 12 executes the installation of the communication control software received by the message transmission/reception section 11.

The address information acquisition section 13 transmits the destination information received by the message transmission/reception section 11 to the address information management apparatus 20. The address information acquisition section 13 receives the IP address of the communication control unit 10b of the destination side from the address information management apparatus 20. By this, the address information acquisition section 13 can acquire the address information of the communication control unit 10b corresponding to the destination information.

The allocated line information management section 14 registers into the allocated line information database 18 the allocated line information related to the communication line allocated to the communication terminal 30 having transmitted the address information registration request message.

Now, referring to FIG. 3, the data structure of the allocated line information database 18 will be described. The allocated line information database 18 includes as data items, for example, an allocated line and terminal identification information. In the allocated line, an ID for identifying a physical line allocated between the self-unit and each communication terminal is stored. In the terminal identification information, information for uniquely identifying the communication terminal communicating via the communication control unit 10 is stored. To the terminal identification information, for example, telephone number, terminal name, mail address, IP address and SIP address are applied.

Figure 4:
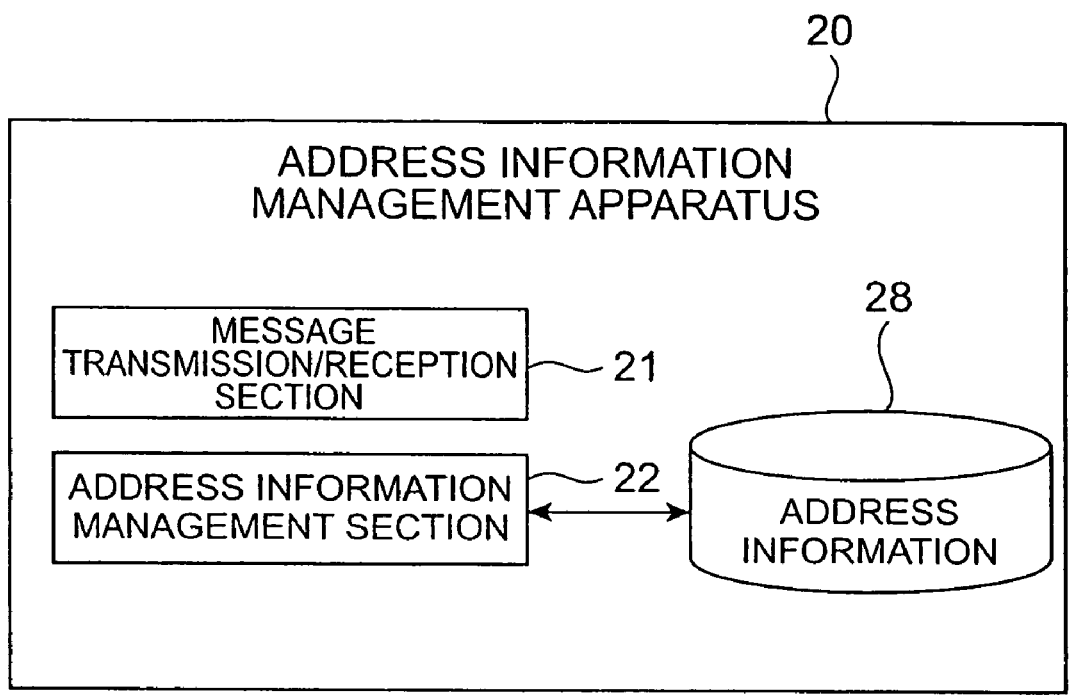
FIG. 4 is a diagram exemplarily illustrating a functional structure of the address information management apparatus shown in FIG. 1.

Next, referring to FIG. 4, the functional stricture of the address information management apparatus 20 according to the present embodiment will be described. As shown in FIG. 4, the communication control unit 10 includes a message transmission/reception section 21 and an address information management section 22.

The message transmission/reception section 21 receives and transmits a variety of messages exchanged with the communication control unit 10. The message contents to be transmitted and received include, for example, an address information registration request message, destination information, and the address information of the communication control unit 10b on the destination side.

The address information management section 22 registers into an address information database 28 the address information of the communication control unit 10 to which the communication terminal 30 is connected. Also, the address information management section 22 extracts from the address information database 28 the address information of the communication control unit 10b on the destination side to which the destination communication terminal 30b is connected, based on the terminal identification information included in the destination information received by the message transmission/reception section 21.

Now, referring to FIG. 5, the data structure of the address information database 28 will be described. The address information database 28 includes, for example, terminal identification information, communication control unit address, and communication control unit ID, as data items. In the terminal identification information, information for uniquely identifying the communication terminal is stored. In the communication control unit address, the IP address of the communication control unit is stored. In the communication control unit ID, an ID for uniquely identifying the communication control unit is stored.

Next, referring to FIGS. 6 and 7, the operation of the communication system according to the present embodiment will be described.

Figure 6:
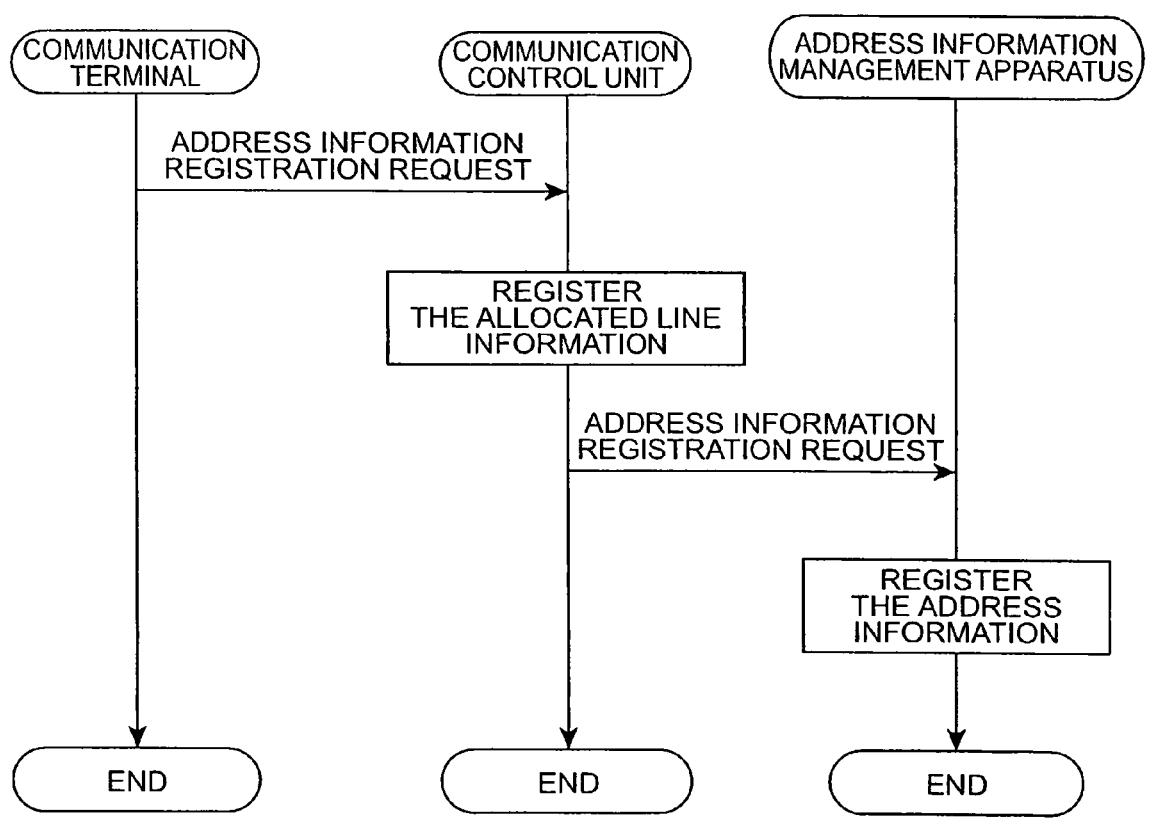
FIG. 6 is a flowchart exemplarily illustrating a process flow when registering address information of a communication control unit, to which a communication terminal is connected, into the address information management apparatus.

FIG. 6 shows a sequence chart exemplarily illustrating a process flow when registering the address information of the communication control unit 10 to which the communication terminal 30 is connected into the address information management apparatus 20.

First, according to the operation instruction from the user, the communication terminal 30 transmits to the communication control unit 10 an address information registration request message, requesting the address information management apparatus 20 to register the address information of the communication control unit 10 to which the self-terminal is connected (step S1). By this, the message transmission/reception section 11 in the communication control unit 10 receives the address information registration request message.

Next, the allocated line information management section 14 in the communication control unit 10 registers into the allocated line information database 18 the allocated line information related to the communication line to be allocated to the communication terminal 30 having transmitted the address information registration request message (step S2).

Next, the message transmission/reception section 11 in the communication control unit 10 transfers the address information registration request message received from the communication terminal 30 to the address information management apparatus 20 (step S3). Additionally, the IP address of the self-communication control unit 10 is added into the address information registration request message to be transferred. By this, the message transmission/reception section 21 in the address information management apparatus 20 receives the address information registration request message.

Next, the address information management section 22 in the address information management apparatus 20 registers into the address information database 28 the terminal identification information of the communication terminal 30 and the IP address of the communication control unit 10 included in the address information registration request message (step S4).

By this, in the address information management apparatus 20, the IP addresses of the communication terminal 30 and the communication control unit 10 can be managed correspondingly, and thus, the existence of the communication terminal 30 can be recognized by the intermediary of the communication control unit 10 capable of participating in the network such as the Internet.

FIG. 7 is a sequence chart exemplarily illustrating a process flow when the source communication terminal 30a from which the message is sent starts communication with the destination communication terminal 30b to which the message is destined.

First, the source communication terminal 30a transmits the destination information related to the destination communication terminal 30b and the communication control software to the communication control unit 10a on the source side (step S11). By this, the message transmission/reception section 11 in the communication control unit 10a on the source side receives both the destination information related to the communication terminal 30b to which the message is to be sent and the communication control software.

Next, the installation execution section 12 in the communication control unit 10a on the source side installs the communication control software received by the message transmission/reception section 11 (step S12).

Next, the address information acquisition section 13 in the communication control unit 10a on the source side transmits the destination information received by the message transmission/reception section 11 to the address information management apparatus 20 (step S13). By this, the message transmission/reception section 21 in the address information management apparatus 20 receives the destination information related to the communication terminal 30b to which the message is to be sent.

Next, based on the terminal identification information included in the destination information received by the message transmission/reception section 21, the address information management section 22 in the address information management apparatus 20 extracts, from the address information database 28, the address information of the communication control unit 10b on the destination side to which the communication terminal 30b is connected (step S14).

Next, the message transmission/reception section 21 in the address information management apparatus 20 transmits the address information of the communication control unit 10b on the destination side extracted by the address information management section 22 to the communication control unit 10a on the source side (step S15). By this, the address information acquisition section 13 in the communication control unit 10a on the source side acquires the address information of the communication control unit 10b on the destination side.

Next, the message transmission/reception section 11 in the communication control emit 10a on the source side transmits the destination information and the software ID for identifying the communication control software, having been received from the communication control unit 10a on the source side, to the address included in the address information of the communication control unit 10b on the destination side (step S16). By this, the message transmission/reception section 11 in the communication control unit 10b on the destination side receives the destination information and the software ID.

Next, the message transmission/reception section 11 in the communication control unit 10b on the destination side transmits the software ID received from the communication control unit 10a on the source side to the destination communication terminal 30b corresponding to the destination information received from the communication control unit 10a on the source side (step S17).

Next, the destination communication terminal 30b transmits the communication control software corresponding to the software ID received from the communication control unit 10b on the destination side, to the communication control unit 10b on the destination side (step S18). By this, the message transmission/reception section 11 in the communication control unit 10b on the destination side receives the communication control software.

Next, the installation execution section 12 in the communication control unit 10b on the destination side installs the communication control software received by the message transmission/reception section 11 (step S19).

By this, the common communication control software is installed in both the communication control unit 10a on the transmission side to which the source communication terminal 30a can be connected and the communication control unit 10b on the destination side to which the destination communication terminal 30b can be connected. Accordingly, communication terminals 30a, 30b can communicate with each other by the intermediary of the communication control units 10a, 10b which can control the network connection of the respective communication terminals. Therefore, it becomes possible to make a variety of types of communication terminals not registered in domains participate in networks such as the Internet.

As having been described above, the communication control unit 10a on the source side in the present embodiment can install the communication control software received from the communication terminal 30a, which is the message source, and accordingly, it becomes possible to control the network connection of the source communication terminal 30a, using the communication control software appropriate for the specification of the source communication terminal 30a.

Further, the communication control unit 10a on the source side can acquire from the address information management apparatus 20 the address information of the communication control unit 10b on the destination side to which the destination communication terminal 30b corresponding to the destination information received from the communication terminal 30a of the message source can be connected. Also, to the IP address included in the above address information, the communication control unit 10a on the source side can transmit the destination information and the software identification information. Thus, it becomes possible to install the communication control software corresponding to the software identification information into the communication control unit 10b on the destination side to which the destination communication terminal 30b can be connected.

According to a communication control unit and a communication control method in accordance with the present invention, it is possible to make a variety of communication terminals not registered in a domain participate in a network without the need of complicated processing.

The entire contents of Japanese Patent Application No. 2005-249895 filed on Aug. 30, 2005 is incorporated herein by reference.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A communication control unit, comprising:
   a receiving unit configured to receive destination terminal identification information uniquely identifying a destination communication terminal to which a message is destined, and software for communication control from a source communication terminal from which the message is sent;
   an installation execution unit configured to install the software received by the receiving unit;
   an address information acquisition unit configured to transmit the destination terminal identification information received by the receiving unit to an externally located address information management apparatus, and to acquire, from the externally located address information management apparatus, address information of another communication control unit to which the destination communication terminal corresponding to the destination terminal identification information can be connected; and
   a transmitting unit configured to transmit the destination terminal identification information received by the receiving unit and software identification information uniquely identifying the software installed by the installation execution unit, to an address of the another communication control unit included in the address information acquired by the address information acquisition unit, and to transmit software identification data to the source communication terminal when the receiving unit receives, over a network, the software identification data and information identifying the source communication terminal, wherein
   the receiving unit is further configured to receive software corresponding to the software identification data, after the transmitting unit transmits the software identification data, and
   the installation execution unit is further configured to install the software corresponding to the software identification data to control a network connection of the source communication terminal to the network via the communication control unit.

2. The communication control unit according to claim 1, further comprising:
   an address information transmitting unit configured to transmit terminal identification information uniquely identifying a communication terminal connectable to the communication control unit and address information of the communication control unit to the address information management apparatus.

3. A communication control method for a communication device, the communication control method comprising:
- a receiving step of receiving, at the communication device, destination terminal identification information uniquely identifying a destination communication terminal to which a message is destined, and software for communication control from a source communication terminal from which the message is sent;
- an installation execution step of installing the software, received in the receiving step, in the communication device;
- an address information acquisition step of transmitting the destination terminal identification information, received in the receiving step, from the communication device to an externally located address information management apparatus and of acquiring, at the communication device, from the externally located address information management apparatus, address information of another communication control unit connectable to the destination communication terminal corresponding to the destination terminal identification information;
- a transmitting step of transmitting, from the communication device, the destination terminal identification information, received in the receiving step, and software identification information uniquely identifying the software, installed in the installation execution step, to an address of the another communication control unit included in the address information acquired in the address information acquisition step;
- a transmission step of transmitting software identification data from the communication device to the source communication terminal, when the communication device receives, over a network, the software identification data and information identifying the source communication terminal;
- a reception step of receiving software corresponding to the software identification data at the communication device, after the transmission step; and
- an installing step of installing the software corresponding to the software identification data in the communication device to control a network connection of the source communication terminal to the network via the communication device.

4. The communication control method according to claim 3, further comprising:
transmitting terminal identification information uniquely identifying the source communication terminal and address information of the communication device to the externally located address information management apparatus.

5. A computer usable medium including computer-executable instructions, wherein the computer-executable instructions, when executed by a processor, cause the processor to perform a communication control method comprising:
- a receiving step of receiving software and destination terminal identification information from a source communication terminal from which a message is sent, the destination terminal identification information uniquely identifying a destination communication terminal to which the message is destined;
- an installing step of installing the software received in the receiving step;
- a transmission step of transmitting, from a message transmission/reception section, the destination terminal identification information received in the receiving step to an externally located address information management apparatus;
- an acquiring step of acquiring, with the message transmission/reception section, from the externally located address information management apparatus, address information of a communication control unit connectable to the destination communication terminal corresponding to the destination terminal identification information;
- a transmission step of transmitting software identification information and the destination terminal identification information from the message transmission/reception section to the communication control unit connectable to the destination communication terminal;
- a transmitting step of transmitting software identification data from the message transmission/reception section to the source communication terminal, when the message transmission/reception section receives, over a network, the software identification data and information identifying the source communication terminal;
- a reception step of receiving software corresponding to the software identification data at the message transmission/reception section, after the transmitting step; and
- an installing step of installing the software corresponding to the software identification data to control a network connection of the source communication terminal to the network via the message transmission/reception section.

6. The computer usable medium according to claim 5, the communication control method further comprising:
transmitting terminal identification information and address information of an other communication control unit to the externally located address information management apparatus, the terminal identification information uniquely identifying the source communication terminal, the other communication control unit including the message transmission/reception section.

* * * * *